(No Model.)
N. H. LONG.
ROLLER SKATE.
No. 324,130.  Patented Aug. 11, 1885.
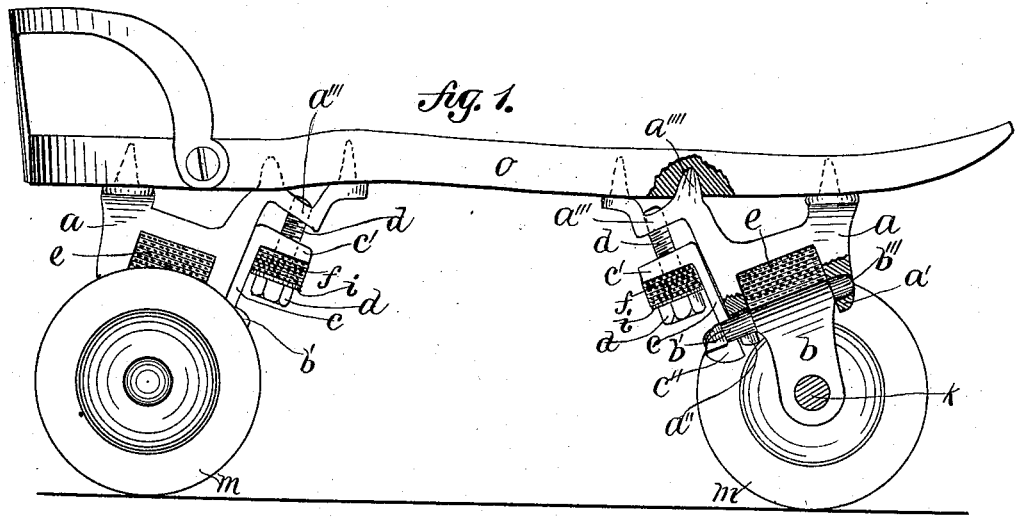
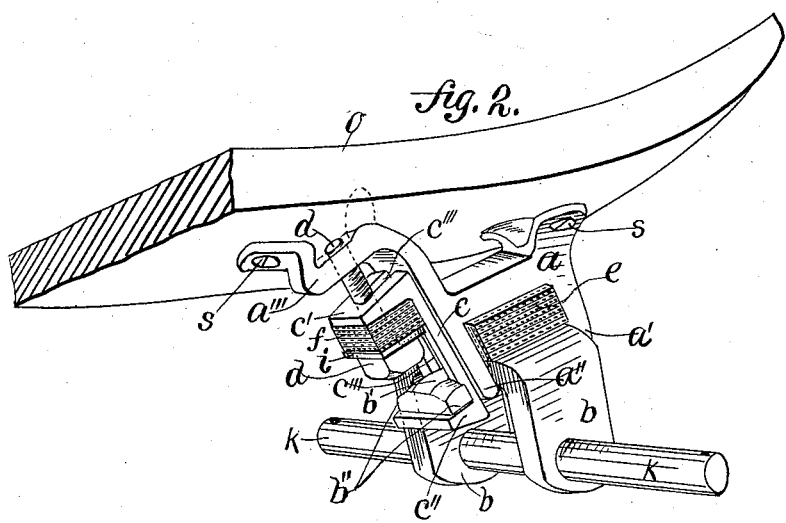
Witnesses:
C. E. Adamson
L. A. Adamson
Nathan H. Long, Inventor;
BY C. E. Adamson
ATTORNEY.
N. PETERS, Photo-Lithographer, Washington, D. C.

UNITED STATES PATENT OFFICE.

NATHAN H. LONG, OF MUNCIE, INDIANA, ASSIGNOR OF ONE-HALF TO EDWARD W. BISHOP, OF SAME PLACE.

ROLLER-SKATE.

SPECIFICATION forming part of Letters Patent No. 324,130, dated August 11, 1885.

Application filed March 13, 1885. (No model.)

*To all whom it may concern:*

Be it known that I, NATHAN H. LONG, a citizen of the United States, residing at Muncie, in the county of Delaware and State of Indiana, have invented a new and useful Improvement in Roller-Skates, of which the following is a description, reference being had to the accompanying drawings, which form a part of this specification.

My invention relates to improvements in roller-skates, and the objects of my invention are to construct a cheap and durable skate. I attain these objects by the mechanism illustrated by the accompanying drawings, in which—

Figure 1 is a side view with one front wheel removed and parts broken away to show details, and Fig. 2 is an enlarged perspective view of the hanger mechanism.

Similar letters refer to similar parts throughout each view.

The hanger-plate $a$ is secured to the skate-bottom by screws $s$, and provided with two inclining lugs, $a'\ a''$, knee $a'''$, and stud $a''''$, all as shown. The hanger $b$ is provided with a stud, $b'''$, on one side and a T-headed stud, $b'$, on the other. The said hanger is inserted in and secured to the plate $a$ by the stud $b'''$ being inserted in a hole in the lower end of lug $a'$, and the T-headed stud $b'$ extending through a slot in the lower end of the lug $a''$. (See the drawings.) The said T-headed stud also passes through the lower end of the slotted bar $c$, which is provided with outward-turned ends $c'\ c''$ and a slot, $c'''$, extending from end to end, as shown in Fig. 2. A tension-screw, $d$, passes up through the washer $i$, rubber cushion $f$, end $c'$ of the bar $c$, and screwed into the knee $a'''$ of the hanger-plate, all as shown. A rubber cushion, $e$, is placed above the hanger $b$, as shown, for the purpose of stiffening the action or tilting of the skate, and the said tilting action is more effectually regulated by tightening or loosening the screw $d$, as one of the ends, $b''$, of the T-head presses down on the lower end, $e''$, of the bar $c$ whenever the bottom $o$ is inclined or tilted to one side, thereby pulling down on the said bar $c$ and rubber $f$. The wheels and straps are secured in any desirable manner.

The stud $a''''$ on the upper part of the hanger-plate $a$ is inserted in the wood bottom, as shown in Fig. 1, so that the hanger-plate cannot slip or move on said bottom, and takes the strain off of the screws $s$.

Having thus described my invention, I claim the following, and desire to secure the same by Letters Patent:

1. In a roller-skate, the hanger-plate $a$, having a knee, $a'''$, and stud $a''''$ on its upper part, all for the purpose set forth.

2. In a roller-skate, the hanger $b$, provided with a stud, $b'''$, and a T-headed stud, $b'\ b''$, in combination with bar $c$, rubber $f$, washer $i$, and screw $d$.

3. In a roller-skate, the bar $c$, having outward-turned ends $c'\ c''$ and slot $c'''$, in combination with the rubber $f$, screw $d$, and T-head $b'\ b''$.

4. In a roller-skate, the hanger-plate $a$, having lugs $a'\ a''$, knee $a'''$, and stud $a''''$, and hanger $b$, having T-head $b'\ b''$ and stud $b'''$, in combination with bar $c\ c'\ c''\ c'''$, washer $i$, rubbers $e\ f$, and screw $d$.

NATHAN H. LONG.

Witnesses:
E. W. BISHOP,
W. R. BROTHERTON.